United States Patent
Weckerling

(10) Patent No.: US 7,112,140 B2
(45) Date of Patent: Sep. 26, 2006

(54) COUNTER TRACK JOINT WITH CONTROL ANGLE REVERSAL

(75) Inventor: Thomas Weckerling, Lohmar (DE)

(73) Assignee: GKN Automotive GmbH, (DE)

(*) Notice: Subject to any disclaimer, the term of this patent is extended or adjusted under 35 U.S.C. 154(b) by 33 days.

(21) Appl. No.: 10/714,058

(22) Filed: Nov. 14, 2003

(65) Prior Publication Data

US 2004/0137991 A1    Jul. 15, 2004

(30) Foreign Application Priority Data

Nov. 15, 2002  (DE)  ................. 102 53 620

(51) Int. Cl.
    *F16D 3/223* (2006.01)
(52) U.S. Cl. ...................... 464/145; 464/906
(58) Field of Classification Search ................ 464/140, 464/145, 906
    See application file for complete search history.

(56) References Cited

U.S. PATENT DOCUMENTS

| | | | | |
|---|---|---|---|---|
| 2,322,570 A | * | 6/1943 | Dodge | .................. 464/145 X |
| 2,949,022 A | * | 8/1960 | Leon | ..................... 464/145 X |
| 6,319,133 B1 | | 11/2001 | Schwarzler et al. | |
| 6,709,338 B1 | * | 3/2004 | Weckerling et al. | ........ 464/145 |

FOREIGN PATENT DOCUMENTS

| | | |
|---|---|---|
| DE | 197 06 864 C1 | 6/1998 |
| DE | 100 60 119 A1 | 6/2002 |
| DE | 100 60 220 A1 | 6/2002 |
| DE | 100 60 220 C2 | 11/2002 |

* cited by examiner

*Primary Examiner*—Greg Binda

(57) ABSTRACT

A constant velocity counter track joint having an outer joint part (12) and an inner joint part forming first and second pairs of tracks (22, 23; 24, 25) each accommodating a torque transmitting ball (14), and a ball cage (15) with windows (18) each receiving at least one of the balls (14). When the joint is aligned, the opening angle ($\alpha$) of the first pairs of tracks (22, 23) opens from the aperture end to the attaching end, and the opening angle ($\beta$) of the second pairs of tracks (24, 25) opens from the attaching end to the aperture end. The first pairs of tracks (22, 23) are designed in such a way that, when the joint is articulated, the opening angle ($\alpha$) of the first pairs of tracks (22, 23), at a ball (14) entering the outer joint part (12) via the central plane (EM), initially becomes zero and then opens towards the aperture end.

18 Claims, 12 Drawing Sheets

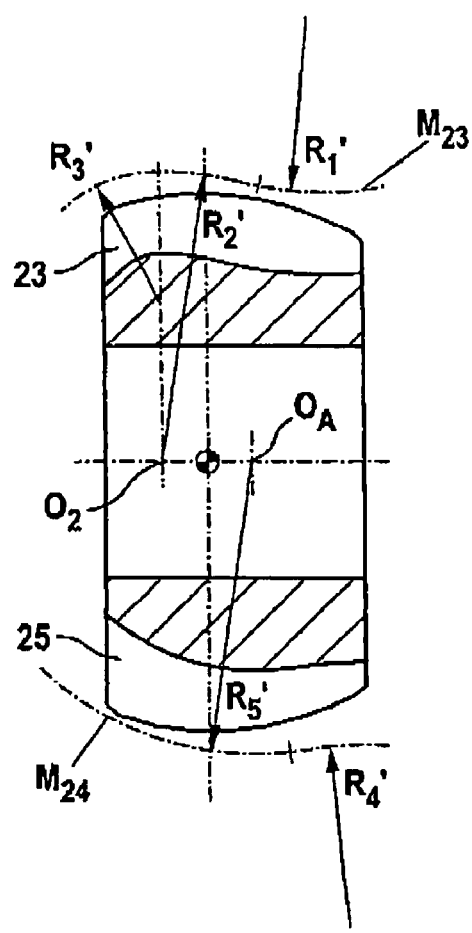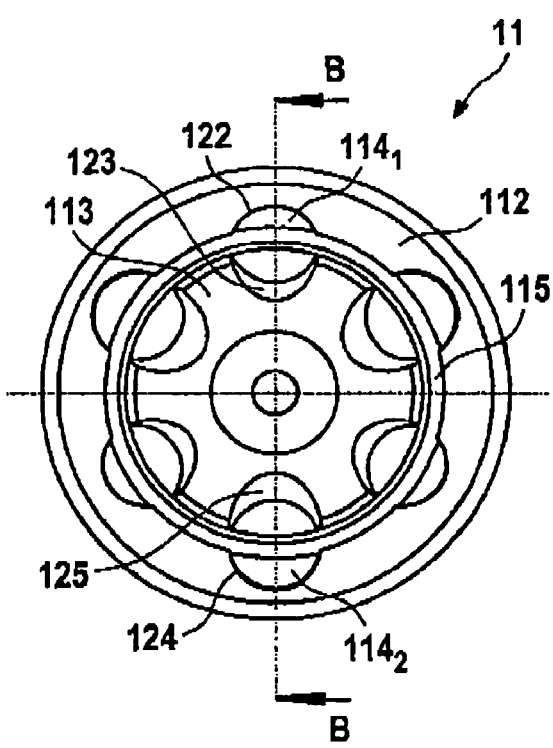
Figure 7D                    Figure 8A

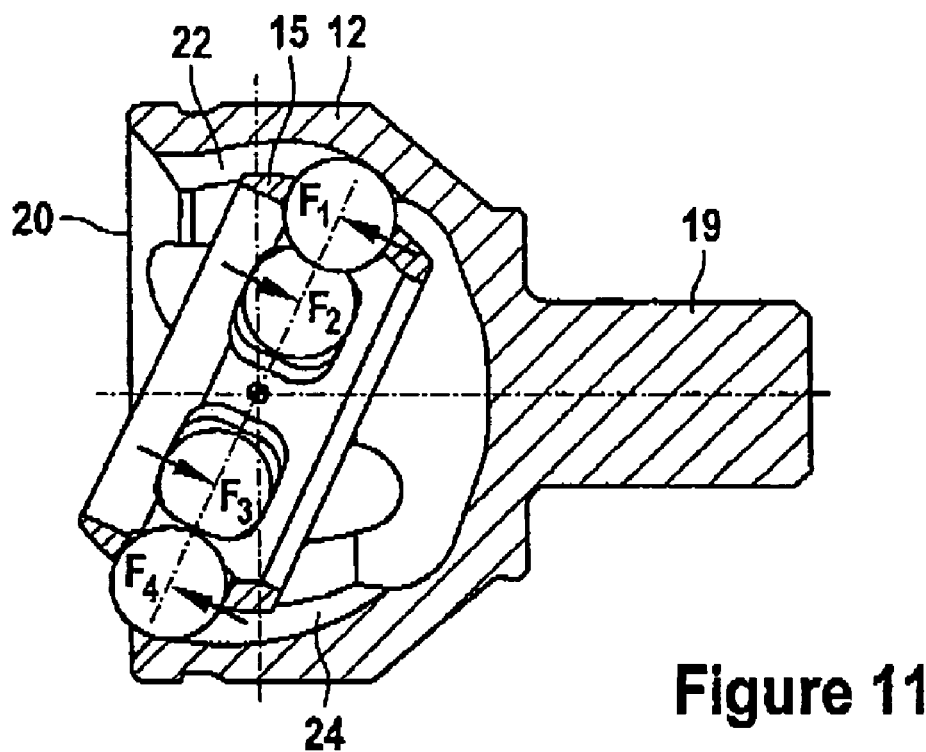
Figure 11
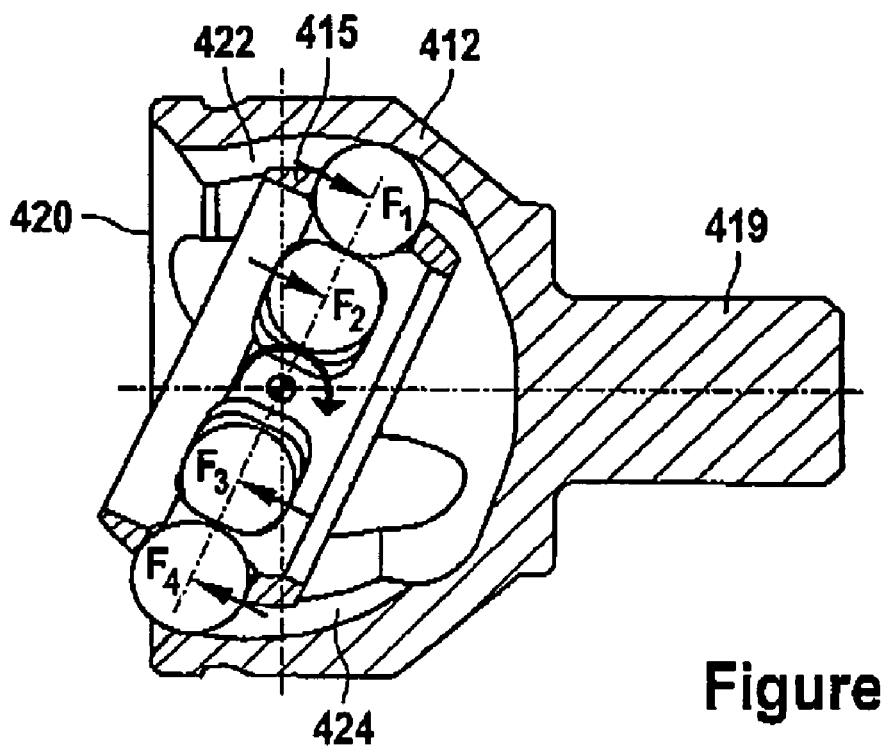
Figure 12 "Prior Art"

COUNTER TRACK JOINT WITH CONTROL ANGLE REVERSAL

TECHNICAL FIELD

The invention relates to a constant velocity universal ball joint in the form of a counter track joint.

BACKGROUND OF THE INVENTION

Counter track joints are described in DE 100 60 119 A1, for example. Counter track joints typically comprise an outer joint part which includes a first longitudinal axis (La), an attaching end and an aperture end which are positioned axially opposite one another, as well as first outer ball tracks and second outer ball tracks. The outer joint part works with an inner joint part which comprises a second longitudinal axis (Li) and an attaching mechanism for a shaft pointing towards the aperture end of the outer joint part, as well as first inner ball tracks and second inner ball tracks. The first outer ball tracks and the first inner ball tracks form first pairs of tracks with one another. The second outer ball tracks and the second inner ball tracks form second pairs of tracks with one another. The pairs of tracks each accommodate a torque transmitting ball. A ball cage is positioned between the outer joint part and the inner joint part and comprises circumferentially distributed cage windows which each receive at least one of the torque transmitting balls. The centers (K) of the balls are held by the cage in a central ball plane (EK). The travel of the centers (K) of the balls in the ball tracks is defined as the center line (M) of the respective ball tracks. In a longitudinal section, the tangents at the balls in the points of contact with the ball tracks form opening angles relative to one another in the ball tracks. When the joint is in the aligned condition, the opening angle (α) of the first pairs of tracks opens from the aperture end to the attaching end. When the joint is in the aligned condition, the opening angle (β) of the second pairs of tracks opens from the attaching end to the aperture end.

Neglecting for a moment the necessary play for the balls, the center lines of the first and second pairs of tracks in an aligned joint are substantially mirror-symmetrical relative to one another with reference to the central plane (EM) of the joint; and when the joint is articulated, they are mirror-symmetric relative to one another with reference to the angle-bisecting plane. The "opening angles" are the angles between tangents at a ball in its points of contact with the track base lines and, respectively, between tangents at the track base lines in points of their greatest proximity to a ball. "Control angle" refers to the spatial angles between tangential planes at a ball in their points of contact with the track flanks under torque. Both angles can change when the joint is articulated and, in a qualitative sense, follow the same course. The angle-bisecting plane of these angles determines the direction of the forces acting from the pair of tracks on to a ball.

The terms "aperture end" and "attaching end" do not exclude the possibility that the counter track joint can be designed in the form of a disc joint which includes an aperture at the attaching end, too. In all cases, the aperture end is the end pointing to the entrance of the shaft into the inner joint part. To characterise the axial directions, the terms "attaching end" and "aperture end" are also used, and remain unchanged, with reference to the inner joint part.

In counter track joints as described in DE 100 60 119 A1, the forces acting on the balls in the first and second pairs of tracks point in opposite directions. The forces are supported by the cage which is thus subjected to a resultant axial force becoming zero. In consequence, the cage is supported in the outer joint part in a way which is substantially free from axial forces, so that the joint is characterised by low friction and thus by ease of operation and a high degree of efficiency.

From DE 100 60 220 A1, there are known counter track joints wherein the first pairs of tracks whose control angles open from the aperture end to the attaching end are widened at the aperture end, taking an S-shaped course. This means that the track center lines of the first outer ball tracks of the first pairs of tracks are curved outwardly towards the aperture end and that the track center lines of the first inner ball tracks are curved outwardly towards the attaching end. This S-shaped course taken by the ball tracks permits an increased joint articulation angle because when the joint is articulated, the balls which move towards the joint aperture are moved across a larger articulation range when still in the ball tracks and are able to contribute to the transmission of torque.

It has already been mentioned in the above publication that the second pairs of tracks of counter track joints of this type can be provided with a design as known from UF (undercut-free) joints or Rzeppa joints, i.e. that the center lines of the outer ball tracks and inner ball tracks consist of circular tracks whose centers are mutually axially offset relative to the central plane of the joint, or they are composed of such circular arches with tangential straight lines adjoining same in opposite directions.

From U.S. Pat. No. 6,319,1331, it is known, even with genuine UF (undercut-free) joints or Rzeppa joints which comprise only pairs of tracks of the type mentioned last, to increase the possible angle of articulation by widening the ball tracks at the aperture end in the outer joint part, and in this case, too, it is possible to achieve a certain advantage in respect of ball guidance and torque transmission by the balls when the joint is articulated at the balls moving in the outer joint part towards the aperture.

The disadvantage of counter track joints, more particularly those wherein the track center lines of the first pairs of tracks are S-shaped, arises in the case of large articulation angles, where there occur positions in which the cage is no longer torque-balanced around the articulation axis. This leads to a deterioration in the joint control and can lead to jamming in the joint.

SUMMARY OF THE INVENTION

The present invention provides a counter track joint which ensures improved cage control conditions at large articulation angles. In the disclosed joint, the first pairs of tracks are designed in such a way that, when the joint is articulated, the opening angle α of the first pairs of tracks, at a ball entering the outer joint part beyond the central plane EM, initially becomes zero and then opens towards the aperture end.

In particular, the first pairs of tracks are designed in such a way that, when the joint is articulated, the opening angle α of the first pairs of tracks, at a ball entering the outer joint part beyond the central plane EM, changes steadily, and in the region of an articulation angle ranging between 11° and 16°, such as at approximately 13°, the opening angle becomes zero.

The track shape described here can be referred to as spiral-like or worm-like, in that the lines of curvature of the first outer ball tracks of the first pairs of tracks in the outer joint part close spiral-like towards the attaching end, and the track center lines of the first inner ball tracks in the inner joint part close worm-like towards the aperture end. In the case of large articulation angles, the opening angles α of the first pairs of track also behave like the opening angles β of the second pairs of tracks over the entire articulation range, i.e. like they do in the RF joints or UF (undercut-free) joints. As a result, even at large articulation angles, substantially as a result of the ball forces extending in the same direction, the cage is torque-balanced relative to the articulation axis.

A further solution is provided wherein the track center lines M22 of the first outer ball tracks of the first pairs of tracks, centrally, comprise an arch with the radius R2 whose center is offset by a first axial offset O1 from the central plane EM of the joint towards the attaching end. Also, in the region adjoining the arch towards the attaching end, the track center lines M22 increasingly deviate radially inwardly from the radius R2. Further, the track center lines M23 of the first inner ball tracks of the first pairs of tracks, centrally, comprise an arch with the radius R2' whose center is offset by a second axial offset O2 from the central plane EM of the joint towards the aperture end. Also, in the region adjoining the arch towards the aperture end, the track center lines M23 increasingly deviate radially inwardly from the radius R2'. More particularly, in another example, the track center lines M22 of the first outer ball tracks, in the region adjoining the arch with the radius R2 towards the attaching end comprise an arch with a smaller radius R3 which steadily adjoins the former. In addition, the track center lines M23 of the first inner ball tracks, in the region adjoining the arch with the radius R2' towards the aperture end, comprise a smaller radius R3' which steadily adjoins the former.

According to a further embodiment, the first pairs of tracks of the present counter track joint comprise track center lines which take an S-shaped course in order to increase the articulation angle and to ensure the transmission of torque at a large articulation angle. More particularly, this means that the track center lines of the first outer ball tracks of the first pairs of tracks, in the region adjoining the arch with the radius R2, towards the aperture end, increasingly deviate radially outwardly from the radius R2. Also, the track center lines of the first inner ball tracks, in the region adjoining the arch with the radius R2', towards the attaching end, increasingly deviate radially outwardly from the radius R2'. More particularly, the track center lines of the first outer ball tracks, in the region adjoining the arch with the radius R2, towards the aperture end; can comprise an arch with the radius R1 which continuously adjoins the former and whose center is positioned outside the radius R2. The track center lines of the first inner ball tracks, in the region adjoining the arch with the radius R2', towards the attaching end, can also comprise a radius R1' which continuously adjoins the former and whose center is positioned outside the radius R2'.

For designing the second pairs of tracks, several possibilities exist, some of which have already been referred to. For instance, the track center lines M24 of the second outer ball tracks of the second pairs of tracks, centrally, can comprise an arch with the radius R5 whose center is offset by a first axial offset O3 from the central plane EM of the joint towards the aperture end and, in the region adjoining the arch, towards the aperture end, they increasingly deviate radially outwardly from the radius R5. At the same time, the track center lines M25 of the second outer ball tracks of the second pairs of tracks, centrally, can comprise an arch with the radius R5' whose center is offset by a second axial offset O4 from the central plane EM of the joint towards the attaching end, and, in the region adjoining the arch, towards the attaching end, they increasingly deviate radially outwardly from the radius R5'. As a further example, the track center lines M24 of the second outer ball tracks, in the region adjoining the arch with the radius R5 towards the aperture end, can comprise an arch with the radius R4 which steadily adjoins the former and whose center is positioned outside the radius R5. Further, the track center lines of the second inner ball tracks, in the region adjoining the arch with the radius R5', towards the attaching end, can comprise an arch with the radius R4' which steadily adjoins the former and whose center is positioned outside the radius R5'.

In an alternative embodiment, the track center lines M24 of the second outer ball tracks, in the region adjoining the arch with the radius R5 towards the aperture end, can comprise a straight line which follows the former tangentially. The track center lines M25 of the second inner ball tracks, in the region adjoining the arch with the radius R5', towards the attaching end, can also comprise a straight line which follows the former tangentially.

The pairs of tracks can be positioned in central planes which contain the longitudinal axes La, Li of the outer joint part and inner joint part. More particularly, this applies to joints with six pairs of tracks and eight pairs of tracks which are alternatingly distributed around the circumference.

The primary advantages of the present design will once again be summarized below. The counter track principle of the joint in accordance with the invention achieves a long service life, even with large permanent angles of articulation within the operational articulation range, with a high degree of efficiency being ensured. The inventive track shape allows good joint control conditions and a high torque transmitting capacity at very large articulation angles. In the several embodiments with S-shaped ball tracks both in the counter tracks (first pairs of tracks) and, optionally, in standard tracks (second pairs of tracks) increased maximum articulation angles up to 50° can be achieved.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 11 shows an inventive joint according to the illustration in FIG. 2, but without the inner joint part.

FIG. 12 shows a counter track joint according to the state of the art in an illustration comparable to FIG. 11.

DETAILED DESCRIPTION

Figure 1:
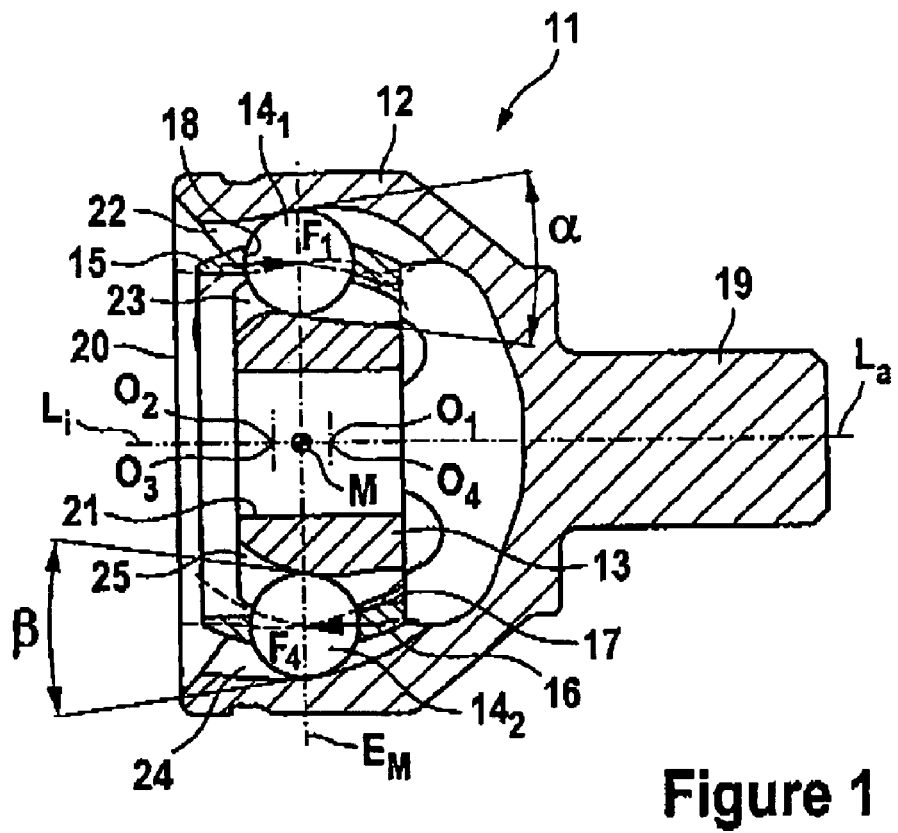
FIG. 1 shows an inventive counter track joint in the aligned condition in a longitudinal section.

FIGS. 1 to 4 will initially be described jointly below. They each show a longitudinal section through an inventive joint 11 which, substantially, comprises an outer joint part 12, an inner joint part 13, torque transmitting balls 14 and a ball cage 15. By way of a spherical outer face 16, the ball cage 15 is held concentrically in the outer joint part 12, whereas, by way of its inner face 17, the ball cage 15 is preferably held with play relative to the inner joint part 13. The balls 14 are held in circumferentially distributed cage windows 18 in the ball cage 15 in a common central ball plane EK. The outer joint part 12 is shown to comprise a longitudinal axis La and the inner joint part 13 defines a longitudinal axis Li. The outer joint part 12 comprises an attaching journal 19 and an aperture 20. The position of the attaching journal 19 indicates the axial direction of the "attaching end" and the position of the aperture 20 indicates the axial direction of the "aperture end." These terms will also be used with reference to the inner joint part 13, although it comprises an aperture 21 for inserting an attaching shaft from the "aperture end."

The joint is shown to comprise a joint center M, four offset points 01, 02, 03, 04 and the central plane EM.

The upper half of each Figure shows a first pair of tracks from a first outer ball track 22 and a first inner ball track 23 in sectional views. The center line M22 of the first outer ball track 22 indicates the travel of the ball center of the ball 14$_1$ with reference to the first outer ball track 22, and the center line M23 of the first inner ball track 23 indicates the travel of the ball center of the ball 14$_1$ with reference to the first inner ball track 23. The two center lines M22, M23 are mirror-symmetrical relative to one another in respect of the central ball plane EK.

The lower halves the Figures show a second pair of tracks with a second outer ball track 24 and a second inner ball track 25 in a sectional view. The center line M24 of the second outer ball track 24 indicates the travel of the ball center of the ball 14$_2$ with reference to the second outer ball track 24, and the center line M25 of the second inner ball track 25 indicates the travel of the ball center of the ball 14$_2$ in respect of the second inner ball track 25. The two center lines M24, M25 are mirror symmetrical relative to one another with reference to the central ball plane EK.

The largely symmetrical position of the center lines M22, M23 as well as M24, M25 relative to one another with reference to the central ball plane EK corresponds to general laws in constant velocity joints of said type. In the illustrations, the track base (not shown in greater detail) of the ball tracks is in contact with the balls, although this does not necessarily have to be the case in actually produced joints. For reasons of simplicity, it is assumed here that the contact between the balls and the ball tracks takes place in the track base. The ball track lines of the ball tracks are equidistant relative to their center lines. When torque is transmitted in the constant velocity joint, the contact of the balls with the ball tracks necessarily moves into the flank regions of the ball tracks.

Below, the differences between FIGS. 1 to 4 will be described.

FIG. 1 shows the inventive joint in an aligned condition. The longitudinal axes La and Li coincide, and the same applies to the offset points 01 and 04 as well as 02 and 03. The first pair of tracks 22, 23 is characterised in that, in the central plane EM, it opens towards the attaching end, i.e. the tangents at the ball contact points in the ball tracks form an opening angle α which opens towards the attaching end. In consequence, the ball 14$_1$, when under torque, experiences a resultant force F1 which points towards the attaching end. The first pair of tracks 22, 23 are configured such that when the joint is articulated, the opening angle (α) of the first pairs of tracks, at a ball (14) entering the outer joint part (12) beyond the central plane (EM), changes at a substantially constant rate.

The second pair of tracks 24, 25 is characterised in that the tracks open in the central plane EM towards the aperture end, i.e. the tangents at the ball contact points in the ball tracks form an opening angle β which opens towards the aperture end. In consequence, the ball, when under torque, experiences a resultant force F4 which points towards the aperture end. The track center lines of the ball tracks can be positioned in central planes containing the first and second longitudinal axes La, Li.

As the resultant of the forces acting on the balls in the first pairs of tracks and in the second pairs of tracks, which are arranged alternately around the circumference, equals zero, the cage is largely free from axial forces and, in the range of the operating angle, the joint runs under low-friction conditions.

Figure 2:
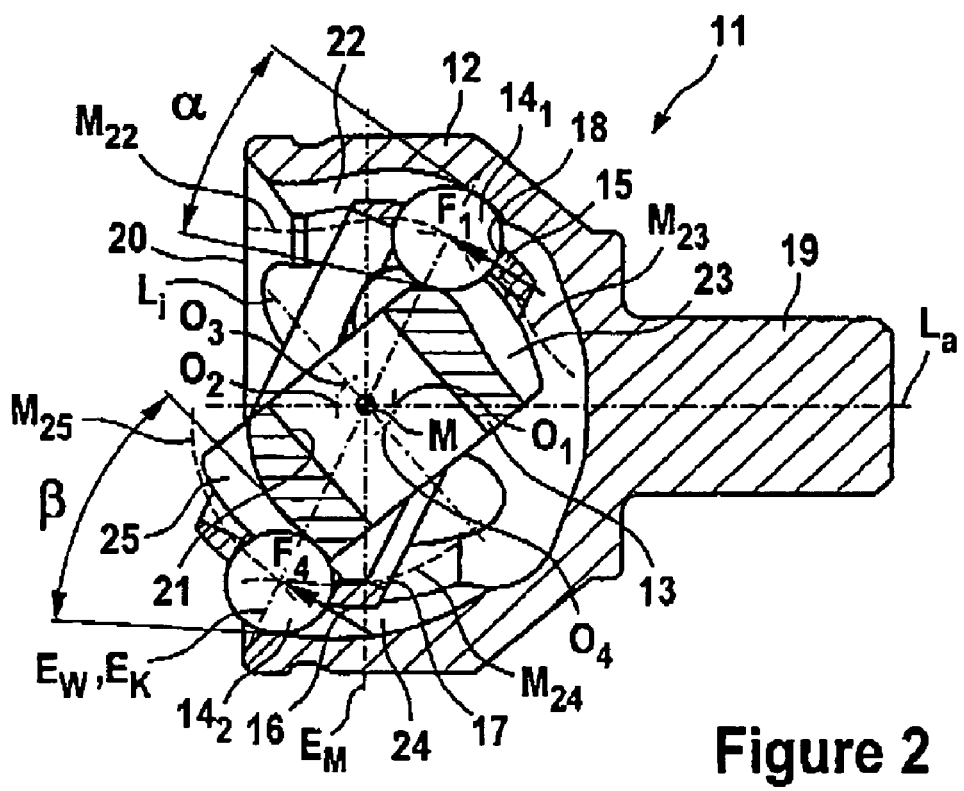
FIG. 2 shows an inventive joint according to FIG. 1 in a condition which is articulated to an extreme extent in a first direction.
Figure 4:
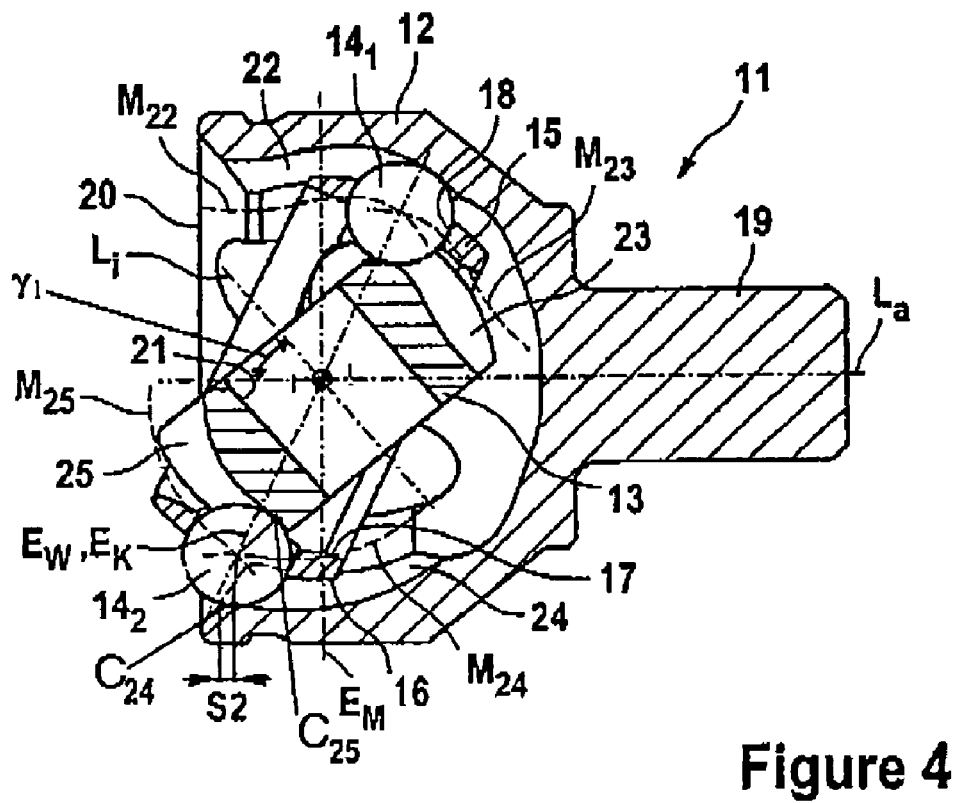
FIG. 4 shows the joint according to FIG. 2 articulated to an extreme extent in the first direction.

In FIG. 2, the joint is articulated by an articulation angle γ1 which is positioned in the drawing plane, with the articulation angle γ1 spanning between the longitudinal axes La and Li (FIG. 4). The central ball plane EK which coincides with the angle-bisecting plane EW is rotated relative to the central plane EM by half the articulation angle γ1/2 (not shown), and as a result of a right-turning rotation in the mathematical sense, the ball 14$_1$ in the first pair of tracks 22, 23 has been displaced towards the attaching end and the ball 14$_2$ in the second pair of tracks has been displaced towards the aperture end. As a result of the inventive track shape of the first pairs of tracks, which has yet to be explained in greater detail, the opening angle α between the tangents at the ball 14$_1$ in the first pair of tracks has now changed to such an extent that it opens towards the aperture end. Under torque, the first pair of tracks 22, 23 now generates a resultant force F1 on to the ball 14$_1$, which points towards the aperture end.

The tangents at the ball $14_2$ in the second pair of tracks 24, 25 span an opening angle β which has increased relative to the original opening angle, but continues to point towards the aperture end. Under torque, the second pair of tracks 24, 25 now generates a resultant force F4 on the ball $14_2$ which also points to the aperture end.

The resultant of the forces acting on the balls in all pairs of tracks is non-zero, so that the cage has to support itself on the outer joint part. But, in return, the cage in the articulation plane is free from torque around the axis of articulation, so that the cage can easily be returned and the joint remains easily controllable.

Figure 3:
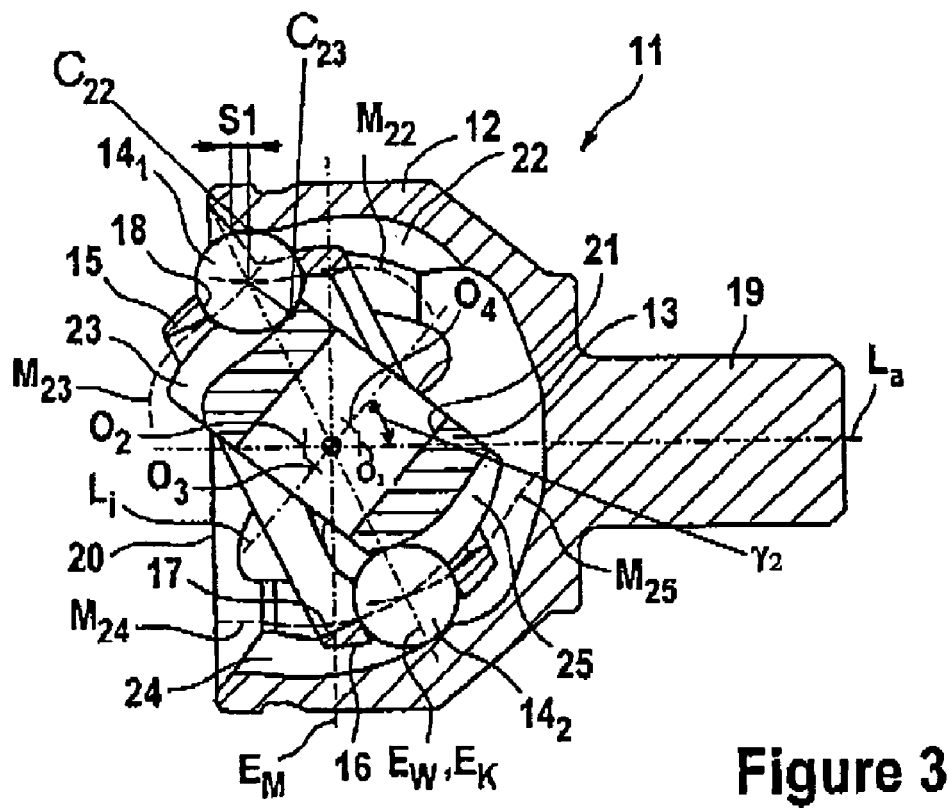
FIG. 3 is a longitudinal section through an inventive joint articulated to an extreme extent in a direction opposed to that shown in FIG. 2.

In FIG. 3, the joint, in the drawing plane, is articulated by a second articulation angle γ2 which has the same size as the articulation angle γ1, but is produced here as a result of a left-turning rotation in the mathematical sense. The articulation angle γ2 spans between the center lines La, Li. The central ball plane EK which coincides with the angle-bisecting plane EW is inclined relative to the central plane EM of the joint by half the articulation angle ($\gamma_2/2$) which is not indicated here. The opening angles are not illustrated in this Figure. Although in the region of the ball $14_1$, the central ball plane EK has already left the first outer ball track 22, the selected track shape ensures that a ball contact point C22 is still removed by a distance S1 from the end of the ball track 22. A ball contact point C23 is also positioned from the end of the ball track 23 by an unspecified distance. The ball $14_1$, thus still has a secure contact within the ball tracks 22, 23 and is thus able to contribute to the transmission of torque. The reason for this, i.e. the design of the first ball tracks 22, 23 at the aperture end is described in detail in U.S. Patent Publication No. 2004/0116192 A1, the contents of which is herein incorporated by reference.

FIG. 4 shows the same joint as FIG. 2, with the articulation angle γ1 in the drawing plane being spanned between the first longitudinal axis La and the second longitudinal axis Li. The opening angles are not illustrated in this Figure. In the region of the ball $14_2$ in the second pair of tracks 24, 25 it is shown that the central ball plane EK which coincides with the angle-bisecting plane EW and is inclined relative to the central plane EM of the joint by half the articulation angle (γ1/2) has already left the region of the outer ball track 24 at said articulation angle. However, because of the track shape of the second pairs of tracks, it is ensured that, nevertheless, the contact point C24 of the ball $14_2$ with the outer track 24 is still positioned within the track by the distance S2. The ball contact point C25 is also remote from the end of the ball track 25 by an unspecified distance. The ball $14_2$ is thus still able to participate in the transmission of torque. The design principle of the track is described in U.S. Pat. No. 6,319,133, the contents of which is herein incorporated by reference.

Figure 5A:
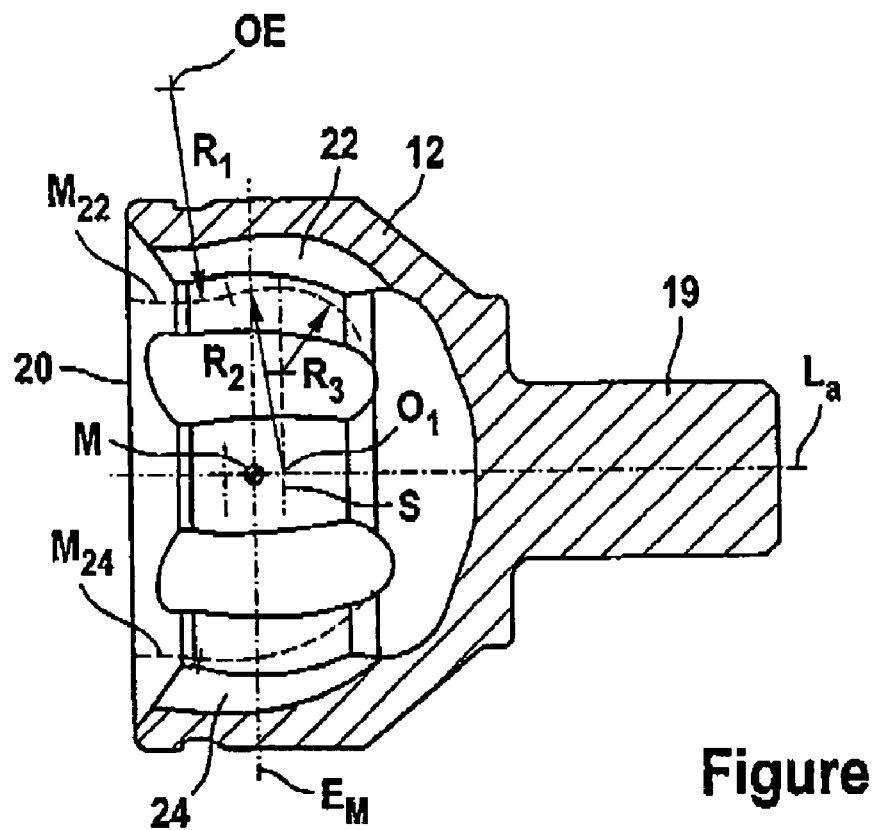
FIGS. 5A and 5B show an outer joint part of an inventive joint in a longitudinal section regarding the first outer tracks and a detail of the same.
Figure 5B:
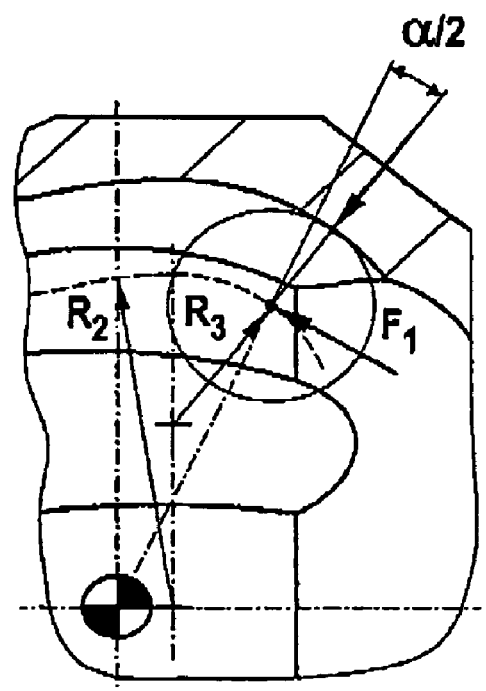
Figure 6:
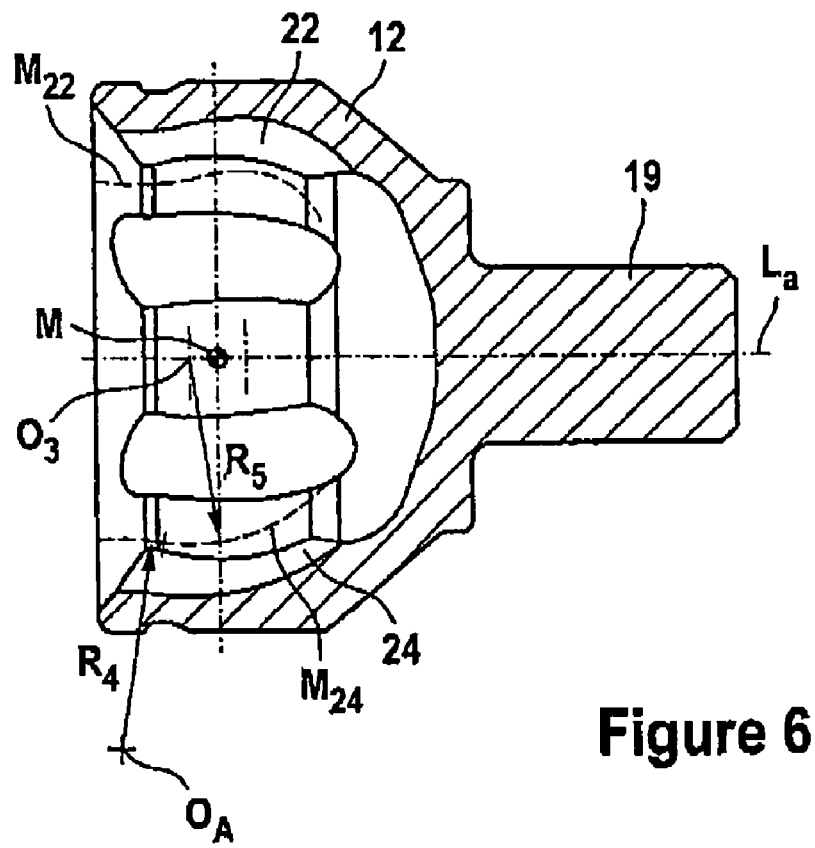
FIG. 6 is a longitudinal section through an outer joint part of an inventive joint, giving details on the second outer tracks.

FIGS. 5 and 6 show the outer joint part 12 in detail in a longitudinal section. These Figures show the central track line M22 of the first outer ball track 22 and the central track line M24 of the second outer track 24.

FIG. 5, in greater detail, shows the course taken by the first outer ball track 22 with reference to its center line M22. In the central region, said track describes a curve around the center 01 with a radius R2. The radius R2 extends towards the attaching end and into a plane S positioned perpendicularly relative to the longitudinal axis La. The radius R2 is steadily followed by a smaller circular arch with the radius R3 whose center OS is positioned on the plane S, thus achieving the inventive reversal of the opening angle α at the balls in the first pairs of tracks when the joint is articulated. Adjoining the first arch with a first radius R2, towards the attaching end, the first outer ball tracks 22 increasingly deviate radially inwardly.

Towards the aperture end, the circular arch with the radius R2 is followed, also steadily, around the center 01, by a circular arch with the radius R1 which is curved in the opposite direction and whose center OE is positioned outside the circle with the radius R2. That is, the track center lines M22 of the first outer ball tracks 22 of the first pairs of tracks, in the region adjoining the first arch with the first radius R2, towards the aperture end, increasingly deviate radially outwardly from said first radius R2. In accordance with the known geometrical laws, the center line M23 of the first inner ball track 23 (which is not shown in this Figure), with coinciding longitudinal axes La, Li, extends symmetrically relative to the center line M22 with reference to the central plane EM, and in all articulated positions of the joint, it remains symmetrical relative to the central line M22 with reference to the central ball plane EK which corresponds to an angle-bisecting plane EW between the longitudinal axes La, Li.

FIG. 6 shows the course taken by the second outer ball track 24 with the help of its center line M24. It comprises, centrally, a circular arch with the radius R5 around a center 03, with the circular arch extending towards the attaching end as far as the end of the ball track. Towards the aperture end, the circular arch is followed by a circular arch with a reversed curvature with the radius R4 whose center OA is positioned outside the circle with the radius R5. Thus, the track center lines M24 of the second outer ball tracks 24 of the second pairs of tracks, centrally, comprise a fifth arch with a fifth radius R5 whose center is offset by a third axial offset O3 from the central plane EM of the joint towards the aperture end and wherein, in the region adjoining said fifth arch towards the aperture end, they increasingly deviate radially outwardly from said fifth radius R5. The associated center line M25 of the second inner ball track 25 shown in FIG. 7D extends symmetrically relative to the illustrated center line M24 with reference to the central plane EM of the joint, with coinciding longitudinal axes La, Li, and, respectively, with a reference to the central ball plane EK in an articulated joint in all positions which corresponds to an angle-bisecting plane EW between the longitudinal axes La, Li. Thus, the track center lines M25 of the second outer ball tracks 25 of the second pairs of tracks, centrally, comprise a sixth arch with a sixth radius R5' whose center is offset by a fourth axial offset O4 from the central plane EM of the joint towards the attaching end, and that, in the region adjoining said sixth arch towards the attaching end, they increasingly deviate radially outwardly from said sixth radius R5' alone the radius R4'.

Figure 7A:
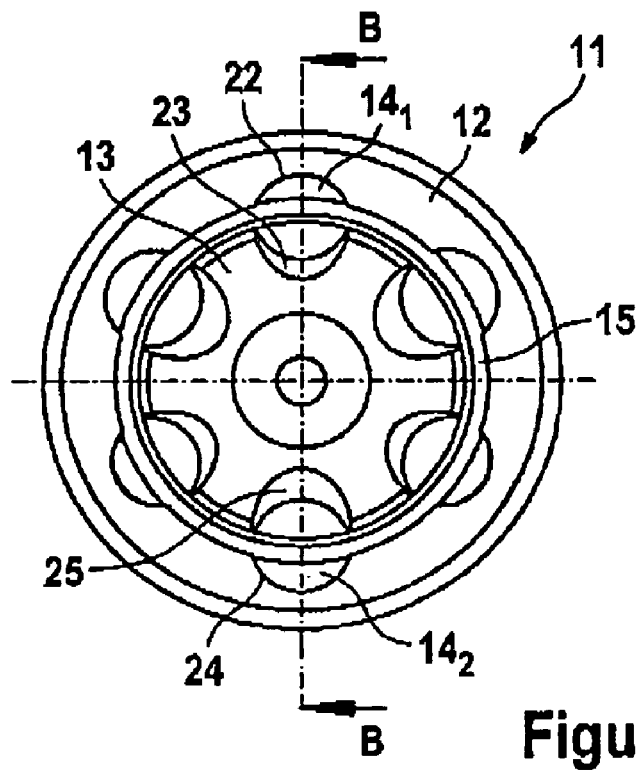
FIG. 7 shows an inventive joint according to the preceding FIGS., with six balls:
A) in an axial view;
B) in a longitudinal section B—B;
C) in a longitudinal section through the outer joint part showing the track detail; and D) in a longitudinal section through the inner joint part showing the track detail.
Figure 7B:
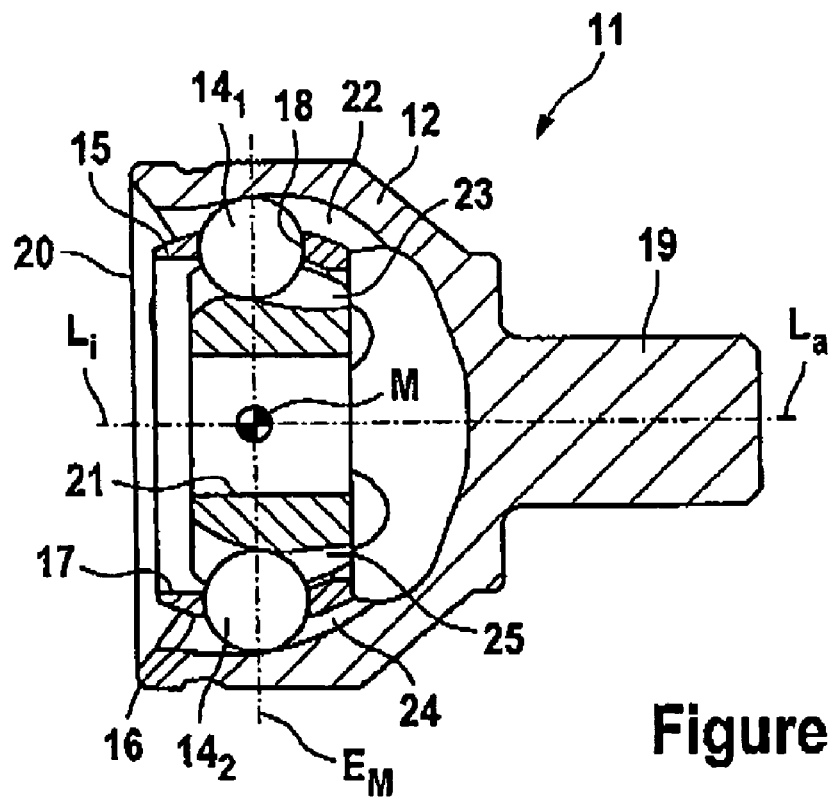
Figure 7C:
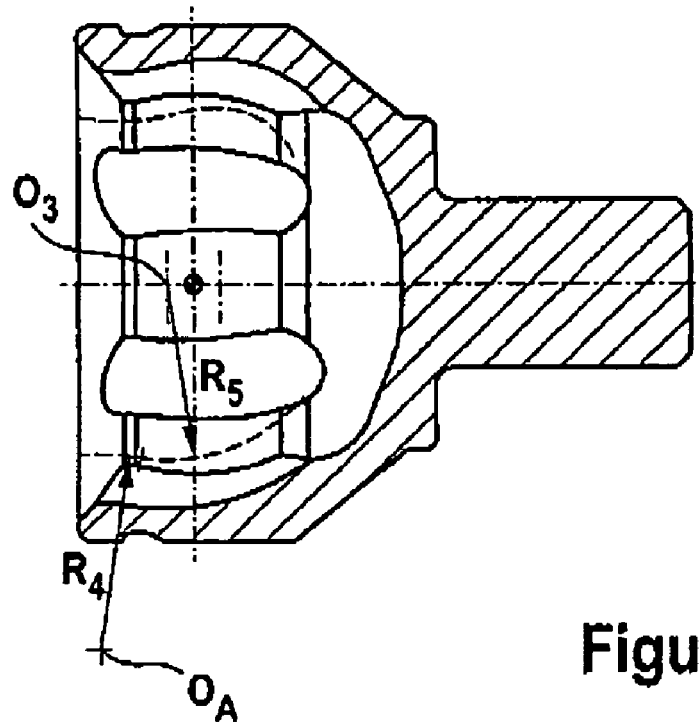

FIG. 7 shows a complete joint according to the preceding drawings, with corresponding parts having the same reference numbers. To that extent, reference is made to the preceding description. The joint is a six ball joint so that three first pairs of tracks 22, 23 alternate across the circumference, one of which is shown in section B—B in the upper half of the Figure, and there are provided three second pairs of tracks 24, 25, one of which is shown in section B—B in the lower half of the Figure. FIGS. 7C and 7D show a detail of the outer and inner joint part track formations, respectively. It can be seen in FIG. 7D that the track center lines M23 of the first inner ball tracks 23, in the region of the second arch with the second radius R2', towards the attaching end, increasingly deviate outwardly from said second radius R2' along the radius R1'. Adjoining the second arch, towards the aperture end, the first inner ball tracks 23 increasingly deviate radially inwardly from an arch having the second radius R2' along the radius R3'.

Figure 8B:
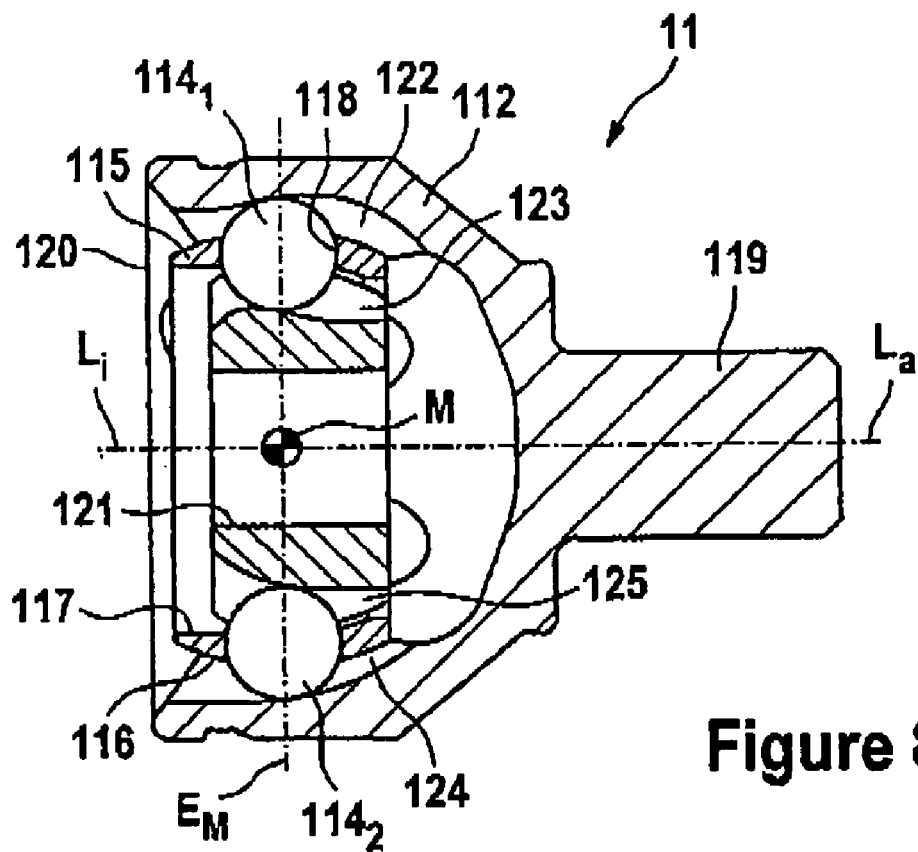
FIG. 8 shows an inventive joint with six balls in a modified embodiment:
A) an in axial view;
B) in a longitudinal section through the ball tracks; and
C) in a longitudinal section through the outer joint part showing the track detail.
Figure 8C:
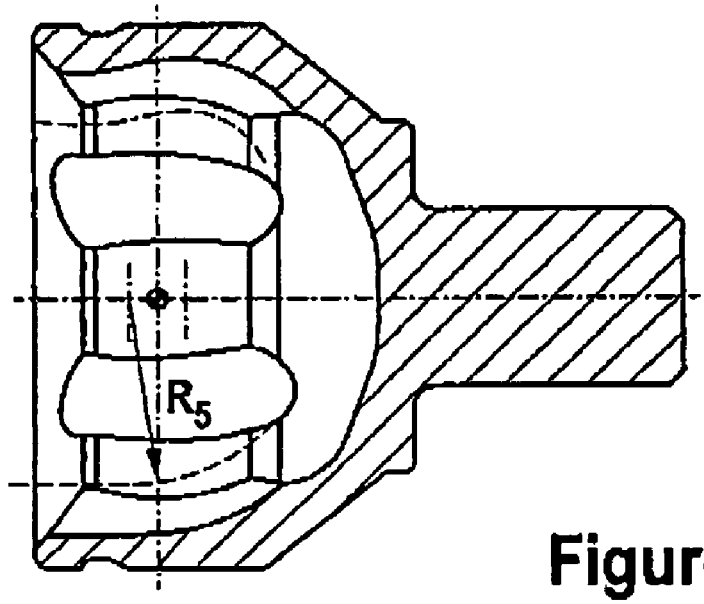
Figure 9A:
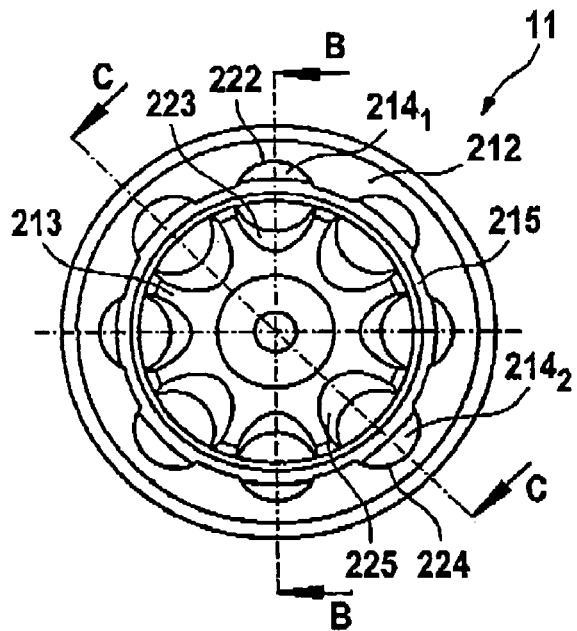
FIG. 9 shows an inventive joint similar to that shown in FIG. 7, with eight balls:
A) in an axial view;
B) in a section B—B through two first pairs of tracks; and
C) in a section C—C through two second pairs of tracks;
D) in an axial view; and
E) in a section E—E through a first and second pair of tracks.
Figure 9B:
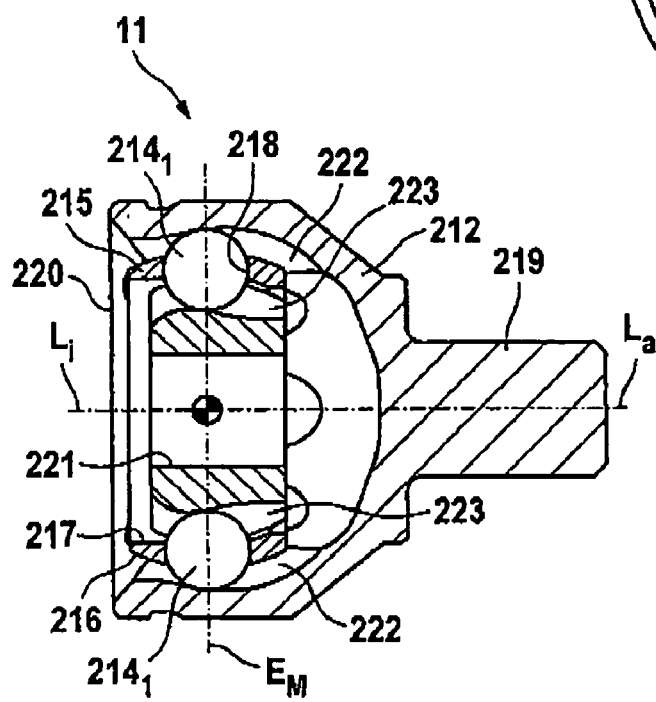
Figure 9C:
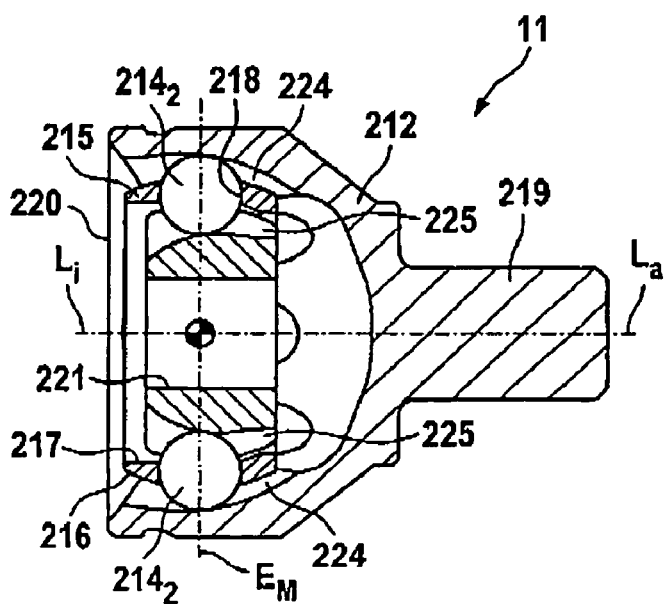
Figure 9D:
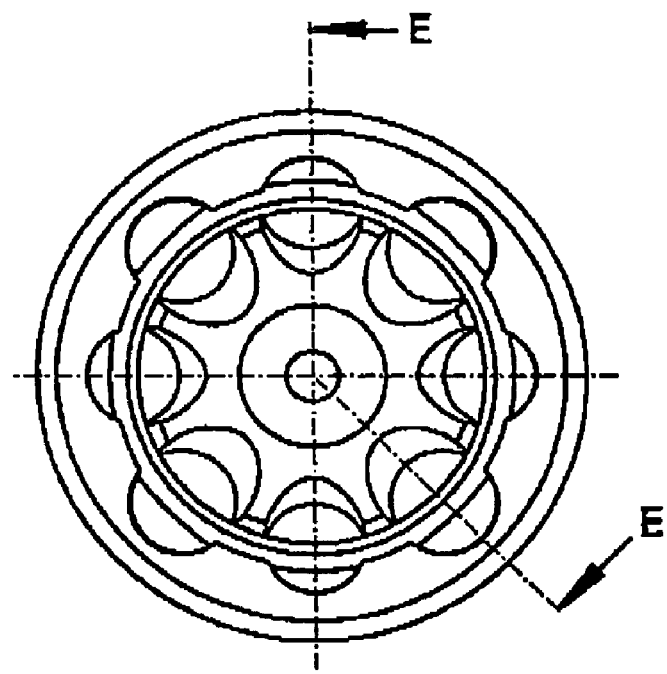
Figure 9E:
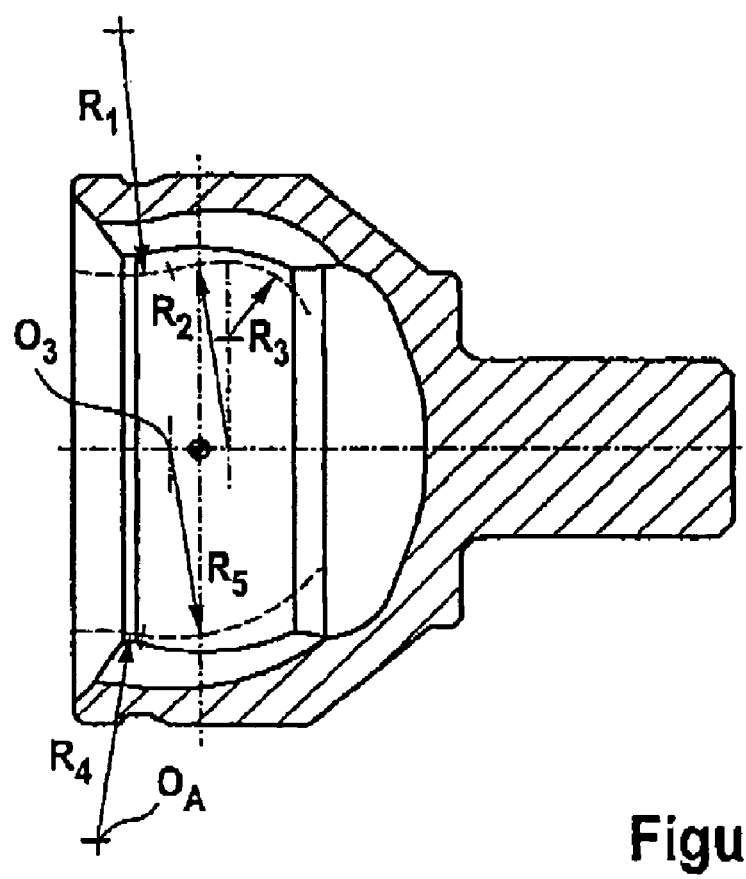
Figure 10A:
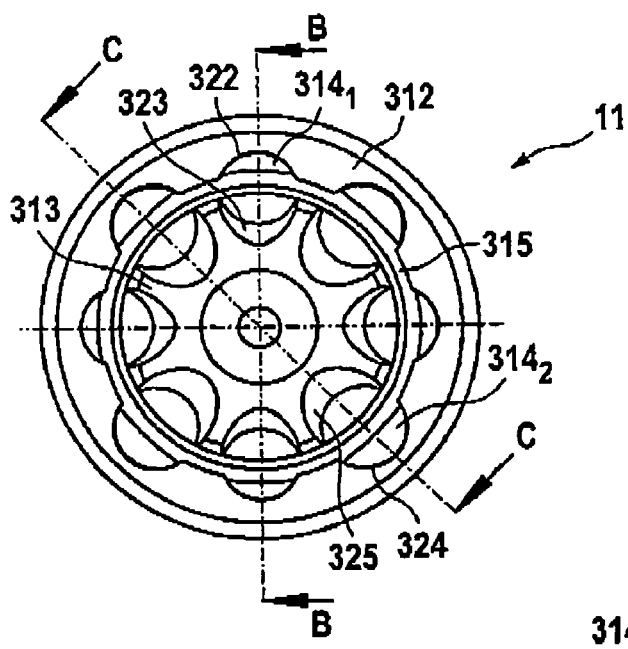
FIG. 10 shows an inventive joint according to FIG. 9 in a modified form:
A) in an axial view;
B) in a section B—B through two first pairs of tracks; and
C) in a section C—C through two second pairs of tracks;
D) in an axial view; and
E) in a section E—E through a first and second pair of tracks.
Figure 10B:
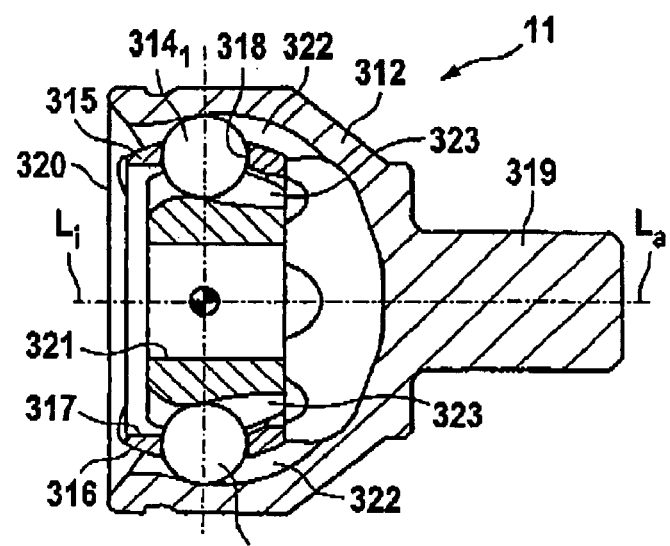
Figure 10C:
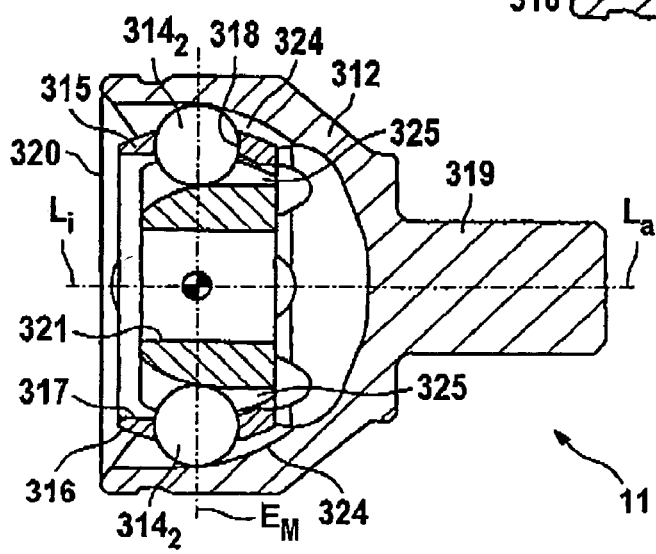
Figure 10D:
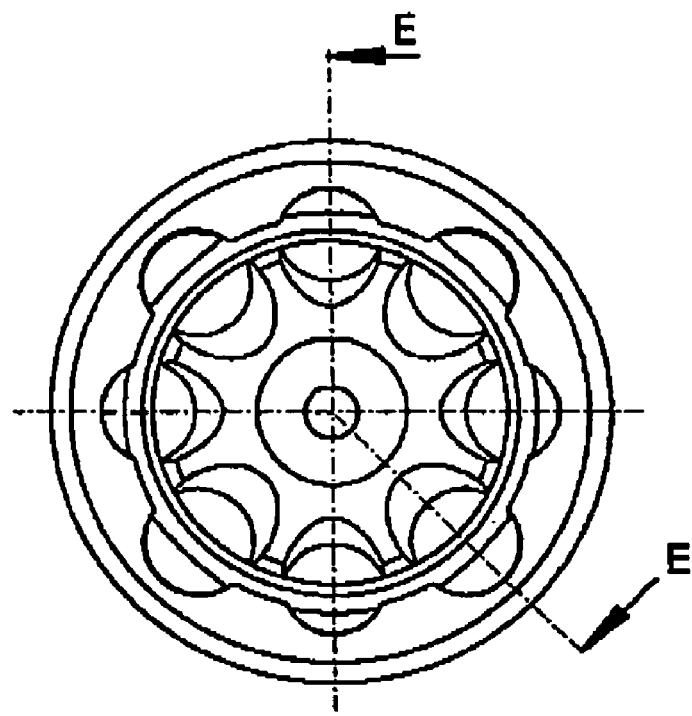
Figure 10E:
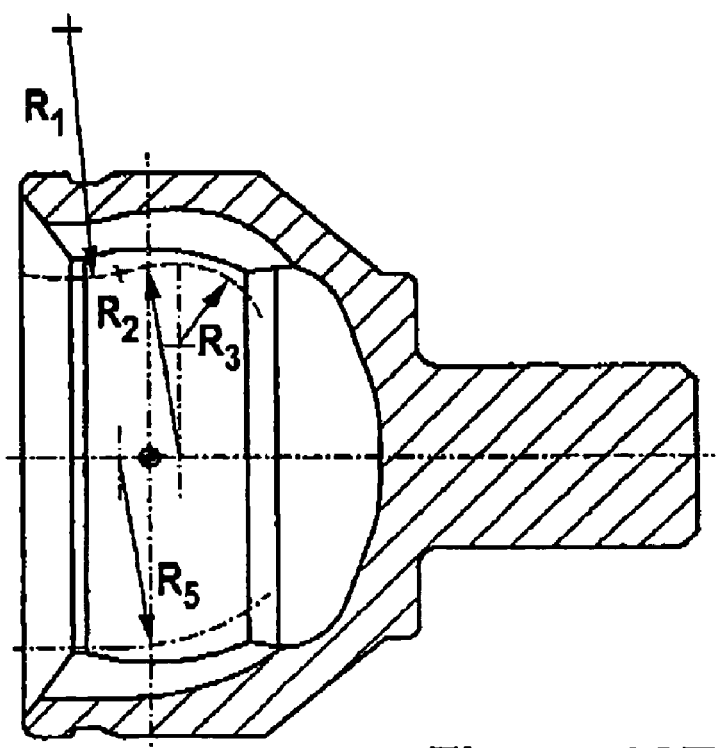

FIG. 8 shows a joint which is similar to that shown in FIG. 7, with similar details having been given reference numbers indexed by 100. To that extent, reference is made to the preceding description. However, the second pairs of tracks 124, 125 are modified in that, following a first circular arch (with the radius R5), their center lines comprise a tangentially adjoining straight line instead of the circular arch curved in the opposite direction. The track shape shown in FIG. 8C thus corresponds to the track shape of standard UF joints.

FIG. 9 shows a joint which is similar to that shown in FIG. 7, but there are provided eight pairs of tracks and eight balls, with first and second pairs of tracks alternating across the circumference. Reference numerals are indexed by 200. FIG. 9B shows two first pairs of tracks 222, 223 along section line B—B of FIG. 9A, and two second pairs of tracks 224, 225 are shown in FIG. 9C along section B—B of FIG. 9A. FIGS. 9D and 9E show the track formation in detail.

FIG. 10 shows a joint which, substantially, comprises the same details as the joint shown in FIG. 9. To that extent, reference is made to the preceding description. In FIG. 10, however, the reference numerals are indexed by 300. However, the second pairs of tracks 324, 325 deviate in that the circular portions of their center lines (with the radius R5), instead of the circular arch curved in the opposite direction, are followed by tangential straight lines. The track shape thus corresponds to that of UF-type joints. FIGS. 10D and 10E show the track formations in detail.

FIGS. 11 and 12, in half a section for a six ball joint, show the forces applied by the tracks to the balls.

FIG. 11 shows an inventive joint wherein, as a result of the inventive course taken by the first ball tracks 22, there occurs a reversal of the force F1 acting on the ball in the articulation plane, so that, taking into account the fact that in addition to the forces F2 and F3 acting on the balls (not illustrated) there are applied forces F5 and F6 extending in identical directions, the cage is subjected to a resultant force directed towards the attaching end, but no torque is generated around the axis of articulation of the joint. As a result, the cage is supported on the outer joint part, so that there are generated friction forces. However, the joint can easily be returned from the articulated position into smaller articulation angles.

FIG. 12 shows how in a conventional counter track joint with extreme articulation, all ball forces acting on the cage with reference to the joint articulation axis act on the cage in the same direction of rotation. The cage is subjected to high torque, as indicated by the rotating arrow. The joint tends to jam, thus, returning the joint to smaller articulation angles is either complicated or impossible. Corresponding parts have been indexed by 400. To that extent, reference is made to the preceding description.

In FIGS. 11 and 12 as in FIGS. 2, 3 and 4 the axis of articulation is normal to the plane of drawing in the joint center M. FIG. 11 differs from FIG. 12 in that the form of track 22 differs with respect to track 422, with a corresponding difference in the inner tracks. The ball contact point (at F1), which is indicated by the arrow, clearly differs for the same joint operating angle. As a result of the track differences, the opening angle ($\alpha$) of FIG. 11 changes in sense of direction, whereas the joint of FIG. 12 has an opening angle ($\alpha$) which does not change in sense.

While the invention has been described in connection with several embodiments, it should be understood that the invention is not limited to those embodiments. Rather, the invention covers all alternatives, modifications, and equivalents as may be included in the spirit and scope of the appended claims.

What is claimed is:

1. A constant velocity joint in the form of a counter track joint comprising:
    an outer joint part (12) comprising a first longitudinal axis (La), an attaching end and an aperture end which are positioned axially opposite one another, as well as first outer ball tracks (22) and second outer ball tracks (24);
    an inner joint part comprising a second longitudinal axis (Li), an attaching mechanism for a shaft pointing towards the aperture end of the outer joint part (12), as well as first inner ball tracks (23) and second inner ball tracks (25), the first outer ball tracks (22) and the first inner ball tracks (23) form first pairs of tracks with one another, the second outer ball tracks (24) and the second inner ball tracks (25) form second pairs of tracks with one another, and the first and second pairs of tracks each accommodate a torque transmitting ball (14); and
    a ball cage (15) positioned between the outer joint part (12) and the inner joint part (13) including circumferentially distributed cage windows (18) which each receive at least one of the torque transmitting balls (14);
    wherein the centers of the balls (14) are held by the cage (15) in a central ball plane (EK), and the travel of the centers of the balls (14) in the ball tracks is defined as the center line (M22, M23, M24, M25) of the respective ball tracks;
    when the joint is in the aligned condition, an opening angle ($\alpha$) of the first pairs of tracks (22, 23) opens from the aperture end to the attaching end;
    when the joint is in the aligned condition, an opening angle ($\beta$) of the second pairs of tracks (24, 25) opens from the attaching end to the aperture end; and
    wherein the first pairs of tracks (22, 23) are configured such that, when the joint is articulated, the opening angle ($\alpha$) of the first pairs of tracks, at a ball (14) entering the outer joint part (12) beyond the central plane (EM), initially becomes zero and then opens towards the aperture end.

2. A constant velocity joint according to claim 1, wherein the first pairs of tracks (22, 23) are configured such that, when the joint is articulated, the opening angle ($\alpha$) of the first pairs of tracks, at a ball (14) entering the outer joint part (12) beyond the central plane (EM), changes at a substantially constant rate.

3. A counter track joint according to claim 1, wherein the track center lines of the ball tracks are positioned in central planes containing the first and second longitudinal axes (La, Li).

4. A counter track joint according to claim 1, comprising three first pairs of tracks (22, 23) and three second pairs of tracks (24, 25) which are alternately arranged across the circumference.

5. A counter track joint according to claim 1, comprising four first pairs of tracks (22, 23) and four second pairs of tracks (24, 25) which are alternately arranged across the circumference.

6. A constant velocity joint in the form of a counter track joint comprising:
    an outer joint part (12) comprising a first longitudinal axis (La), an attaching end and an aperture end which are positioned axially opposite one another, as well as first outer ball tracks (22) and second outer ball tracks (24);

an inner joint part comprising a second longitudinal axis (Li), an attaching mechanism for a shaft pointing towards the aperture end of the outer joint part (12), as well as first inner ball tracks (23) and second inner ball tracks (25), the first outer ball tracks (22) and the first inner ball tracks (23) form first pairs of tracks with one another, the second outer ball tracks (24) and the second inner ball tracks (25) form second pairs of tracks with one another, and the first and second pairs of tracks each accommodate a torque transmitting ball (14); and a ball cage (15) positioned between the outer joint part (12) and the inner joint part (13) including circumferentially distributed cage windows (18) which each receive at least one of the torque transmitting balls (14);

wherein the centers of the balls (14) are held by the cage (15) in a central ball plane (EK), and the travel of the centers of the balls (14) in the ball tracks is defined as the center line (M22, M23, M24, M25) of the respective ball tracks;

when the joint is in the aligned condition, an opening angle (α) of the first pairs of tracks (22, 23) opens from the aperture end to the attaching end;

when the joint is in the aligned condition, an opening angle (β) of the second pairs of tracks (24, 25) opens from the attaching end to the aperture end; and wherein the track center lines (M22) of the first outer ball tracks (22) of the first pairs of tracks, centrally, comprise a first arch with a first radius (R2) whose center is offset by a first axial offset (O1) from the central plane (EM) of the joint towards the attaching end and wherein, adjoining said first arch, towards the attaching end, they increasingly deviate radially inwardly from said arch having said first radius (R2) and wherein the track center lines (M23) of the first inner ball tracks (23) of the first pairs of tracks, centrally, comprise a second arch with a second radius (R2') whose center is offset by a second axial offset (O2) from the central plane (EM) of the joint towards the aperture end, and wherein, adjoining said second arch towards the aperture end, they increasingly deviate radially inwardly from said arch having said second radius (R2').

7. A constant velocity joint according to claim 6, wherein the track center lines (M22) of the first outer ball tracks (22), adjoining the first arch with the first radius (R2) towards the attaching end, comprise a third arch with a smaller radius (R3) which steadily adjoins the former, and wherein the track center lines (M23) of the first inner ball tracks, adjoining the second arch with the second radius (R2'), towards the aperture end, comprise a fourth arch with a smaller radius (R3') which steadily adjoins the former.

8. A constant velocity joint according to claim 7, wherein the track center lines (M24) of the second outer ball tracks (24) of the second pairs of tracks, centrally, comprise a fifth arch with a fifth radius (R5) whose center is offset by a third axial offset (O3) from the central plane (EM) of the joint towards the aperture end and wherein, adjoining said fifth arch towards the aperture end, they increasingly deviate radially outwardly from said arch having said fifth radius (R5) and wherein the track center lines (M25) of the second outer ball tracks (25) of the second pairs of tracks, centrally, comprise a sixth arch with a sixth radius (R5') whose center is offset by a fourth axial offset (O4) from the central plane (EM) of the joint towards the attaching end, and that, adjoining said sixth arch towards the attaching end, they increasingly deviate radially outwardly from said arch having said sixth radius (R5').

9. A constant velocity joint according to claim 6, wherein the track center lines (M22) of the first outer ball tracks (22) of the first pairs of tracks, adjoining the first arch with the first radius (R2), towards the aperture end, increasingly deviate radially outwardly from said arch having said first radius (R2) and wherein the track center lines (M23) of the first inner ball tracks (23), adjoining of the second arch with the second radius (R2'), towards the attaching end, increasingly deviate outwardly from said arch having said second radius (R2').

10. A constant velocity joint according to claim 9, wherein the track center lines (M22) of the first outer ball tracks (22), adjoining the first arch with the first radius (R2), towards the aperture end, comprise a third arch with a third radius (R1) which continuously adjoins the former and whose center is positioned outside the second radius (R2), and wherein the track center lines (M23) of the first inner ball tracks (23), adjoining the second arch with the second radius (R2'), towards the attaching end, comprise a fourth radius (R1') which continuously adjoins the former and whose center is positioned outside the second radius (R2').

11. A constant velocity joint according to claim 10, wherein the track center lines (M24) of the second outer ball tracks (24) of the second pairs of tracks, centrally, comprise a fifth arch with a fifth radius (R5) whose center is offset by a third axial offset (O3) from the central plane (EM) of the joint towards the aperture end and wherein, adjoining said fifth arch towards the aperture end, they increasingly deviate radially outwardly from said arch having said fifth radius (R5) and wherein the track center lines (M25) of the second outer ball tracks (25) of the second pairs of tracks, centrally, comprise a sixth arch with a sixth radius (R5') whose center is offset by a fourth axial offset (O4) from the central plane (EM) of the joint towards the attaching end, and that, adjoining said sixth arch towards the attaching end, they increasingly deviate radially outwardly from said arch having said sixth radius (R5').

12. A constant velocity joint according to claim 9, wherein the track center lines (M24) of the second outer ball tracks (24) of the second pairs of tracks, centrally, comprise a fifth arch with a fifth radius (R5) whose center is offset by a third axial offset (O3) from the central plane (EM) of the joint towards the aperture end and wherein, adjoining said fifth arch towards the aperture end, they increasingly deviate radially outwardly from said arch having said fifth radius (R5) and wherein the track center lines (M25) of the second outer ball tracks (25) of the second pairs of tracks, centrally, comprise a sixth arch with a sixth radius (R5') whose center is offset by a fourth axial offset (O4) from the central plane (EM) of the joint towards the attaching end, and that, adjoining said sixth arch towards the attaching end, they increasingly deviate radially outwardly from said arch having said sixth radius (R5').

13. A constant velocity joint according to claim 6, wherein the track center lines (M24) of the second outer ball tracks (24) of the second pairs of tracks, centrally, comprise a fifth arch with a fifth radius (R5) whose center is offset by a third axial offset (O3) from the central plane (EM) of the joint towards the aperture end and wherein, adjoining said fifth arch towards the aperture end, they increasingly deviate radially outwardly from said arch having said fifth radius (R5) and wherein the track center lines (M25) of the second outer ball tracks (25) of the second pairs of tracks, centrally, comprise a sixth arch with a sixth radius (R5') whose center is offset by a fourth axial offset (O4) from the central plane (EM) of the joint towards the attaching end, and that, adjoining said sixth arch towards the attaching end, they increasingly deviate radially outwardly from said arch having said sixth radius (R5').

14. A counter track joint according to claim 13, wherein the track center lines (M24) of the second outer ball tracks (24), adjoining the fifth arch with the fifth radius (R5) towards the aperture end, comprise a seventh arch with a seventh radius (R4) which adjoins the former and whose center is positioned outside the fifth radius (R5), and wherein the track center lines (M25) of the second inner ball tracks (25), adjoining the sixth arch with the sixth radius (R5') towards the attaching end, comprise an eighth arch with an eighth radius (R4') which adjoins the former and whose center is positioned outside the sixth radius (R5').

15. A counter track joint according to claim 13, wherein the track center lines (M24) of the second outer ball tracks (24), in the region adjoining the fifth arch with the fifth radius (R5), towards the aperture end, comprise a steadily joining straight line, and wherein the track center lines (M25) of the second inner ball tracks (25), in the region adjoining the sixth arch with the sixth radius (R5') towards the attaching end, comprise a steadily joining straight line.

16. A counter track joint according to claim 6, wherein the track center lines of the ball tracks are positioned in central planes containing the first and second longitudinal axes (La, Li).

17. A counter track joint according to claim 6, comprising three first pairs of tracks (22, 23) and three second pairs of tracks (24, 25) which are alternately arranged across the circumference.

18. A counter track joint according to claim 6, comprising four first pairs of tracks (22, 23) and four second pairs of tracks (24, 25) which are alternately arranged across the circumference.

* * * * *

UNITED STATES PATENT AND TRADEMARK OFFICE
CERTIFICATE OF CORRECTION

PATENT NO. : 7,112,140 B2  Page 1 of 1
APPLICATION NO. : 10/714058
DATED : September 26, 2006
INVENTOR(S) : Thomas Weckerling It is certified that error appears in the above-identified patent and that said Letters Patent is hereby corrected as shown below:

In The Specification:
Column 5, Line 5, should read as follows: -- A) in an axial view; --

In The Specification:
Column 5, Line 12, should read as follows: -- B) in a section B-B through two first pairs of tracks; --

In The Specification:
Column 5, Line 19, should read as follows: -- B) in a section B-B through two first pairs of tracks; --

In The Specification:
Column 9, Line 55, should read as follows: -- In FIGS. 11 and 12, as in FIGS. 2, 3, and 4, the axis of --

Signed and Sealed this

Twelfth Day of December, 2006

JON W. DUDAS
*Director of the United States Patent and Trademark Office*